June 27, 1939.     S. J. WITTMAN     2,163,653
AIRPLANE LANDING GEAR
Filed Feb. 26, 1937
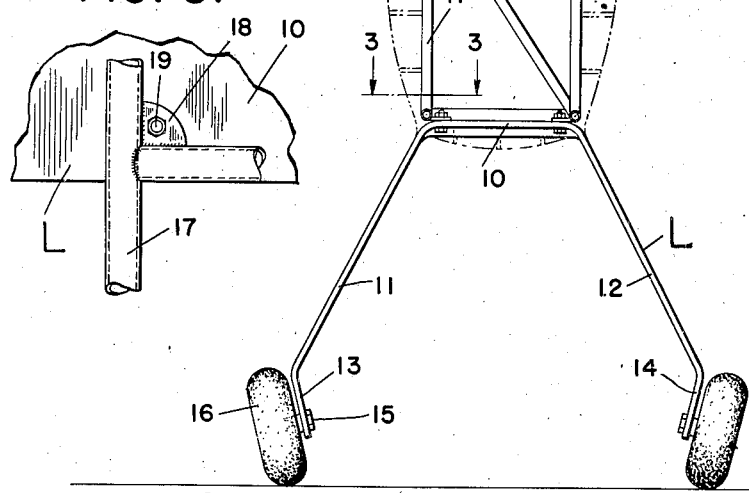
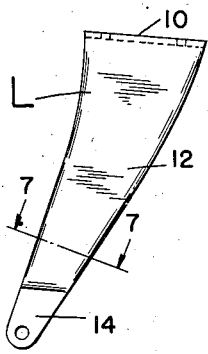
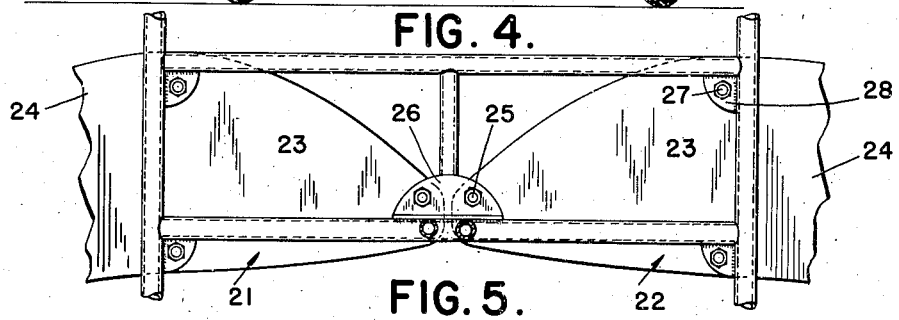
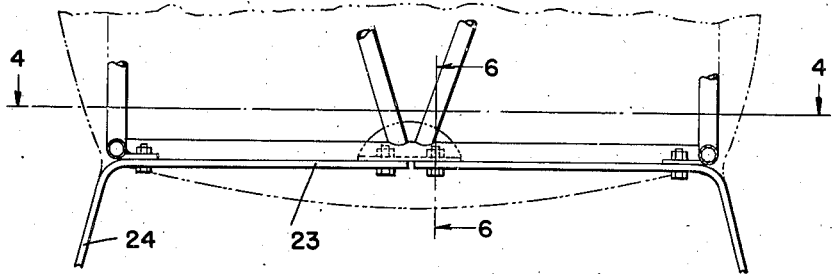
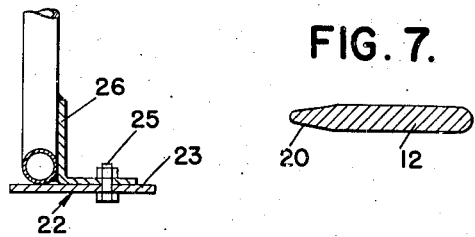
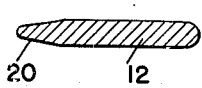
INVENTOR
SYLVESTER J. WITTMAN
BY
ATTORNEYS Patented June 27, 1939

2,163,653

UNITED STATES PATENT OFFICE 2,163,653

AIRPLANE LANDING GEAR

Sylvester J. Wittman, Oshkosh, Wis.

Application February 26, 1937, Serial No. 127,935

1 Claim. (Cl. 244—104)

This invention appertains to airplanes, and more particularly to a novel landing gear therefor.

One of the primary objects of my invention is to provide an airplane landing gear of an especially simple, strong, and durable construction, and one in which the frontal area or head resistance is reduced to a minimum.

Another salient object of my invention is to provide a landing gear of a light construction, so that the weight of the airplane will be reduced to a minimum.

Another important object of my invention is to provide a fool-proof landing gear, which, after being assembled on the plane, requires no further attention from attendants and the like, the landing gear entirely eliminating the use of oil and spring shock struts, shock cords and the like, as now commonly employed on airplanes.

A further object of my invention is to provide a landing gear, which will be very flexible and relieve the shock loads of landing from the fuselage, wheels, and tires, and at the same time have a maximum amount of strength.

A further important object of my invention is to provide a landing gear having the wheel struts thereof formed directly from resilient material and extending downwardly from the fuselage at an angle, and directly supporting the landing wheels, whereby the struts themselves can flex under stress and permit the wheels to move transversely of the fuselage and transversely of the line of travel of the airplane.

A still further object of my invention is to provide an airplane landing gear of the above character, which can be manufactured and incorporated with an airplane at an exceptionally low cost.

With these and other objects in view the invention consists in the novel construction, arrangement, and formation of parts, as will be hereinafter more specifically described, claimed, and illustrated in the accompanying drawing, in which drawing:

Figure 1 is a front elevation of one form of my novel landing gear, showing the same attached to the framework of the fuselage of an airplane, only parts of the framework being shown.

Figure 2 is a side elevation of the landing gear with the wheels removed.

Figure 3 is an enlarged, detail, horizontal sectional view taken on the line 3—3 of Figure 1, looking in the direction of the arrows.

Figure 4 is a horizontal sectional view taken substantially on the line 4—4 of Figure 5, looking in the direction of the arrows, illustrating another form of the landing gear.

Figure 5 is a fragmentary, front elevational view of that form of landing gear shown in Figure 4, the view illustrating the gear attached to a fragment of the framework of the airplane fuselage.

Figure 6 is a detail, vertical sectional view taken on the line 6—6 of Figure 5, looking in the direction of the arrows.

Figure 7 is a detail section through the landing gear, taken on the line 7—7 of Figure 2.

Referring to the drawing in detail, wherein similar reference characters designate corresponding parts throughout the several views, the letter L generally indicates my improved landing gear, which is preferably constructed from a single blank of resilient material of the desired gauge.

As illustrated, the landing gear L is of a substantially inverted U-shape in front elevation, and thus includes the substantially horizontally disposed connecting body portion 10 and the downwardly extending diverging legs 11 and 12. These legs form the landing gear struts and have formed on their lower terminals the inwardly directed angularly extending arms 13 and 14. These arms 13 and 14 carry stub axles 15 for the landing wheels 16.

The landing gear can be secured to the fuselage of the airplane in any preferred manner, but, as illustrated in Figures 1 and 3, I preferably secure to the tubular pieces 17 of the framework of the fuselage bracket plates 18. These bracket plates 18 can be welded to the framework, if so desired, and the same are apertured for the reception of holding bolts, which extend through the body portion 10 of the landing gear.

If desired, the leading edges of the legs 11 and 12 of the landing gear can be beveled or tapered, as at 20, so as to reduce head resistance, but, obviously, the entire landing gear is of such a construction that little or no frontal area is offered thereby.

In view of the novel construction shown and described, the use of dashpots, shock-absorbing springs and the like is entirely eliminated, and upon the landing of the plane the legs 11 and 12 will spring laterally and thus effectively absorb shock and relieve the fuselage and wheels from undue stress. As the legs 11 and 12 flex laterally, the wheels 16 will be shifted transversely of the airplane and transversely of the line of travel of the airplane.

This type of landing gear is particularly adapted for use in racing planes and the like, but, obviously, the landing gear can be used on other types of airplanes.

In airplanes of the large character having wide fuselages, such as in passenger planes, the landing gear can be made in sections. In Figures 4 and 5 I have shown such a construction.

As shown in these figures, the landing gear can be divided in the center and formed from two like companion sections 21 and 22. These sections each include the inwardly extending, substantially horizontally disposed attaching portions 23 and the downwardly and outwardly inclined legs 24, which correspond to the legs 11 and 12 of that form of landing gear shown in Figures 1 to 3 inclusive.

To reduce weight, the attaching portions 23 are preferably tapered toward their inner ends, and these ends terminate substantially at the longitudinal center of the fuselage and can be connected by means of bolts 25 to an angle bracket 26. This angle bracket can be welded or otherwise secured to the tubular framework of the fuselage. The attaching portions 23, adjacent their outer ends, are preferably connected by means of bolts 27 to anchor plates 28 welded to the fuselage framework.

From the foregoing description it can be seen that I have provided an exceptionally simple and durable form of landing gear in which the struts of the landing gear themselves are formed from resilient or flexible material.

Changes in details may be made without departing from the spirit or the scope of my invention, but what I claim as new is:

An airplane landing gear comprising, diverging landing gear struts formed from resilient material having inwardly directed converging arms formed on the lower ends thereof, said arms being normally disposed at an angle to the vertical, and landing wheels rotatably carried by said arms and adapted to move transversely of the gear upon outward flexing movement of the struts.

SYLVESTER J. WITTMAN.